United States Patent [19]

Ashbee

[11] Patent Number: 4,999,156
[45] Date of Patent: Mar. 12, 1991

[54] BI-DIMENSIONAL COMPRESSION METHOD

[75] Inventor: Kenneth H. G. Ashbee, Knoxville, Tenn.

[73] Assignee: University of Tennessee Research Corporation, Knoxville, Tenn.

[21] Appl. No.: 487,202

[22] Filed: Mar. 1, 1990

Related U.S. Application Data

[62] Division of Ser. No. 243,691, Sep. 13, 1988, Pat. No. 4,906,434.

[51] Int. Cl.$^5$ .............................................. B22F 7/00
[52] U.S. Cl. ........................................... 419/5; 419/8; 419/66; 264/299; 264/313; 264/334; 99/495; 100/110; 100/116
[58] Field of Search ................. 419/5, 8, 66; 264/299, 264/313, 334; 99/495; 100/110, 116

[56] References Cited

U.S. PATENT DOCUMENTS

| | | | |
|---|---|---|---|
| 3,340,055 | 9/1967 | Cloran et al. | 75/214 |
| 3,797,986 | 3/1974 | Onder | 425/352 |
| 3,992,202 | 11/1976 | Dulis et al. | 75/222 |
| 4,208,174 | 6/1980 | Tarecco | 425/78 |
| 4,368,074 | 1/1983 | Otto, Jr. et al. | 419/51 |
| 4,414,028 | 11/1983 | Inoue | 419/31 |
| 4,478,787 | 10/1984 | Nadkarni et al. | 419/51 |
| 4,536,366 | 8/1985 | Inoue | 419/11 |
| 4,584,170 | 4/1986 | Aslund et al. | 419/5 |
| 4,645,624 | 2/1987 | Ramm et al. | 419/51 |
| 4,657,822 | 4/1987 | Goldstein | 419/5 |

FOREIGN PATENT DOCUMENTS 2159456A 1/1985 United Kingdom .

OTHER PUBLICATIONS

Authors: A. S. Saada and F. C. Townsend, Title: State of the Art: Laboratory Strength Testing of Soils Publication: Laboratory Shear Strength of Soil.

*Primary Examiner*—Stephen J. Lechert, Jr.
*Attorney, Agent, or Firm*—Luedeka, Hodges, Neely & Graham

[57] ABSTRACT

Apparatus and methods for compressing a mass utilizing a plurality of interfitting anvils mounted for movement relative to one another along co-planar paths and include faces which, when the anvils are operatively moved relative to one another, exert compression on a mass positioned between the faces in at least two directions in a plane simultaneously. The faces of the apparatus can be so shaped that the cross section of the mass being compressed is urged toward a shape other than that of a regular polygon. Methods of the invention include the consolidation of a mass of compactable material enclosed within a hollow tube having deformable walls, the extraction of juice or oil from fruit or seeds and the internal fracturing of solids so as to swell materials such as solid rocket propellants.

4 Claims, 3 Drawing Sheets

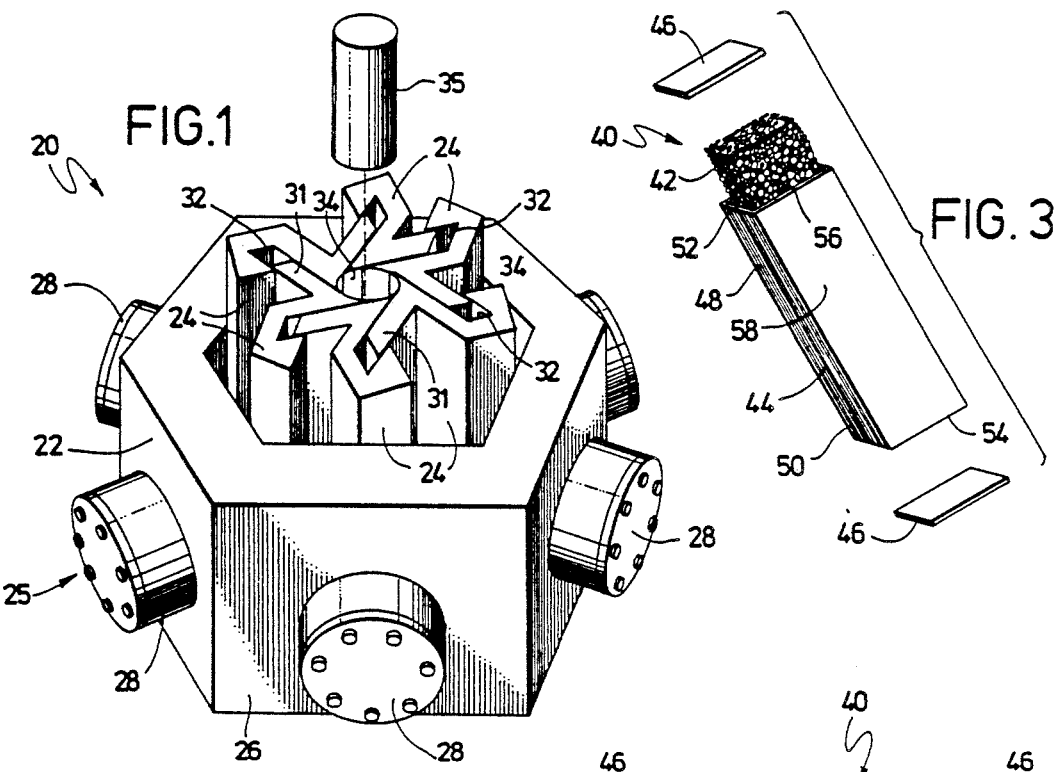
FIG. 1
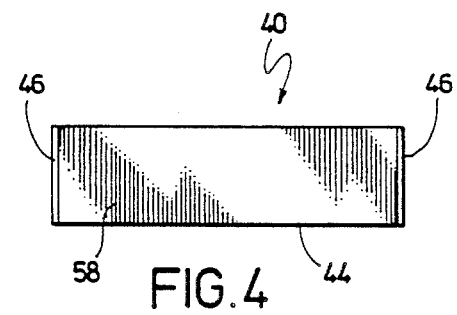
FIG. 3
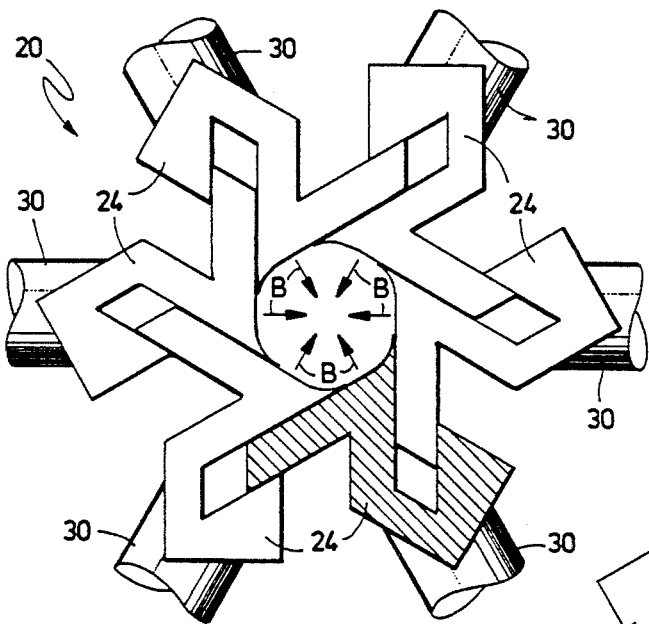
FIG. 2
FIG. 4
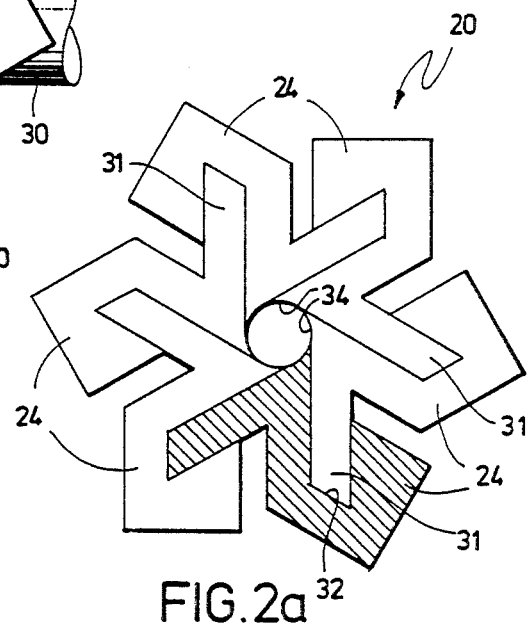
FIG. 2a

BI-DIMENSIONAL COMPRESSION METHOD

This is a division of application Ser. No. 243,691, filed Sept. 13, 1988, U.S. Pat. No. 4,906,434.

BACKGROUND OF THE INVENTION

This invention relates generally to compression methods and apparatus and relates more particularly to methods and apparatus for compressing a mass in at least two coplanar directions.

There exists apparatus for imparting bi-dimensional compression on a mass, such as a workpiece comprised of bar stock. Such an apparatus may include a plurality of interfitting anvils mounted for movement relative to one another along coplanar paths and wherein the anvils define faces which exert compression on the workpiece positioned therebetween in at least two directions in a plane simultaneously. An example of such an apparatus is shown and described in United Kingdom patent application GB No. 2 159 456 A, published Dec. 4, 1985 and naming as a co-inventor the inventor in the instant case.

A limitation associated with the apparatus such as described in the referenced patent relates to the fact that the faces of the anvils are shaped so that the cross-sectional shape of the workpiece compressed by the apparatus is urged toward the shape of a regular polygon having sides of equal length.

It is an object of the present invention to provide a new and improved apparatus for compressing a workpiece along two or more directions in a plane simultaneously wherein the cross-sectional shape of the workpiece is urged toward a shape other than that of a regular polygon.

Another object of the present invention is to provide such an apparatus for urging the cross-sectional shape of a workpiece toward a circular shape.

Still another object of the present invention is to provide such an apparatus which is well-suited for two-dimensional compression testing of cylindrically-walled vessels.

Yet another object of the present invention is to provide a new and improved method for consolidating or sintering a sinterable mass comprised, for example, of metal particles or powders.

A further object of the present invention is to provide such a method for sintering utilizing two-dimensional compression which method can be performed relatively quickly.

A still further object of the present invention is to provide such a method for sintering wherein the strength of the sintered product resulting from the method is enhanced.

A yet further object of the present invention is to provide a method for extracting liquids, such as juice or oil, from liquid-containing objects, such fruit or seeds.

One more object of the present invention is to provide such a method for extracting liquids, such as juice or oil, utilizing two-dimensional compression.

Still one more object of the present invention is to provide a new and improved method for fracturing solids in two-dimensional stress fields so as to swell materials possessing the consistency of solid polybutadiene containing mechanically rigid particles.

Yet one more object of the present invention is to provide such a method for fracturing materials which is well-suited for accelerating the combustion reaction of solid rocket propellant.

SUMMARY OF THE INVENTION

This invention resides in two-dimensional compression apparatus and methods utilizing two-dimensional compression.

In one aspect of the present invention, a two-dimensional compression apparatus includes a rigid frame and a plurality of interfitting anvils supported by the frame for movement relative to one another along co-planar paths. The anvils include faces which, when the anvils are operatively moved relative to one another in a compression operation, exert compression on a workpiece along at least two directions in a plane simultaneously. The faces of the anvils include portions for engaging a workpiece during a compression operation and for urging the cross section of the workpiece toward a shape other than that of a regular polygon.

In another aspect of the present invention, a method for consolidating or sintering a mass of sinterable material includes the steps of placing an amount of sinterable material within a hollow tube having deformable walls so that the cavity of the tube is substantially filled by the amount of sinterable material. The ends of the tube are then capped with deformable plugs to thereby enclose the amount of sinterable material within the tube. Two dimensional compression is then applied to the tube wherein the pressure of compression is applied along two or more directions in a plane simultaneously and wherein the plane in which the compression is applied is oriented generally perpendicular to the longitudinal axis of the tube.

In still another aspect of the present invention, a method for extracting liquids from liquid-containing objects, such as fruit or seeds, includes the step of applying bi-directional compression to the liquid-containing object so that compression is exerted thereupon along two directions in a plane simultaneously and so that liquid contained within the object is squeezed therefrom.

In yet another aspect of the present invention, a method for internally fracturing so as to swell material possessing the consistency of solid polybutadiene containing mechanically-rigid particles includes the step of applying two-dimensional compression to the material so that the material fractures adjacent its mechanically rigid particles to create voids adjacent thereto on unloading. Such a fracturing method may involve the movement of anvils outwardly against the walls of the casing.

BRIEF DESCRIPTION OF THE DRAWING FIGURES

FIG. 1 is a perspective view of one embodiment of the apparatus of the present invention.

FIG. 2 is a fragmentary plan view of the FIG. 1 embodiment, shown somewhat schematic, illustrating one positional relationship of the anvils thereof.

FIG. 2a is a view similar to that of FIG. 2 illustrating another positional relationship of the anvils thereof.

FIG. 3 is an exploded perspective view of an assembly containing particulate mass to be sintered in accordance with an embodiment of the method of the present invention.

FIG. 4 is a side elevational view of the FIG. 3 assembly.

DETAILED DESCRIPTION OF PREFERRED EMBODIMENTS

Figure 5:
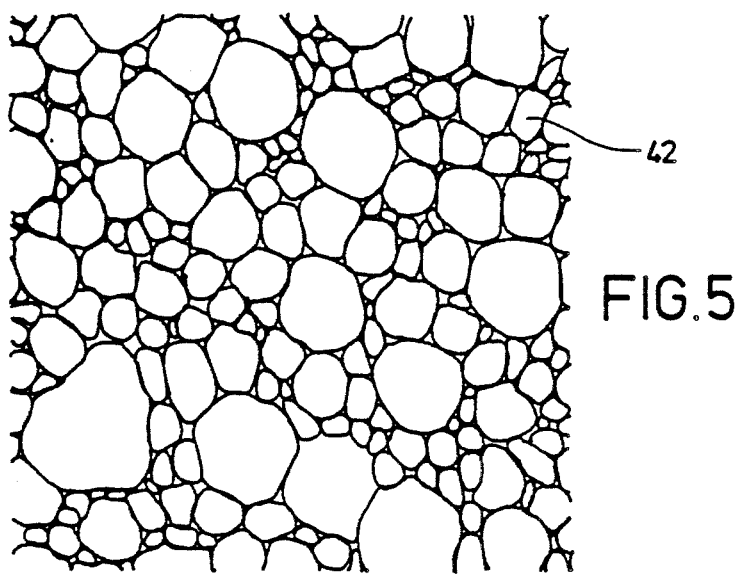
FIG. 5 is a transverse cross-sectional view, magnified greatly, of the FIG. 3 assembly after being compressed in accordance with an embodiment of the method of the present invention.

Turning now to the drawings in greater detail and considering first FIGS. 1, 2 and 2a, there is shown an embodiment of a two-dimensional compression apparatus, generally indicated 20, in accordance with the present invention. The apparatus 20 includes a rigid base 22 and six interfitting anvils 24 supported by the base 22 for movement relative to one another and means, generally indicated 25, for moving the anvils relative to one another. The base 22 is in the form of a hollow body 26, and the anvils 24 are operatively positioned within the hollow interior of the base body 26. The moving means 25 includes four hydraulic cylinder assemblies 28 fixed to the outside surface of the base body 26 and associated piston rams 30 which are each connected at one end to a corresponding one of the anvils 24. Each cylinder assembly 28 is operatively connected to a source of hydraulic fluid (not shown) so that actuation of the assemblies 28 effects appropriate movement of the rams 20 and anvils 24.

As best shown in FIG. 2, each anvil 24 (one of which is cross-hatched for purposes of understanding) is generally G-shaped in cross-section and so as to define a leg 31 and a leg-receiving slot 32 having opposing parallel sidewalls. Each leg-receiving slot 32 operatively receives the leg 31 of an adjacent anvil 24 so that as the anvils 24 are operatively moved relative to one another, each leg 31 is guided along a linear path by the slot 32. Hence, the interfitting or meshed relationship of the anvils 24 permits the anvils 24 to be simultaneously advanced in a manner which moves each leg 31 inwardly of its corresponding slot 32 and permits the anvils 24 to be simultaneously retracted in a manner which moves each leg 31 outwardly of its corresponding slot 32.

In accordance with the present invention, each anvil 24 defines a face 34 adapted to engage a workpiece 35 (FIG. 1) operatively positioned within the anvil 24 and which cooperates with the face of every other anvil 24 to urge the cross-sectional shape of the workpiece 35 being compressed toward a shape other than that of a regular polygon. In the depicted embodiment 20, the faces 34 are so shaped that when the anvils 24 are in a predetermined relationship relative to one another, the faces 34 collectively define a regular polygonal prism in the form of a cylinder. In this connection and as best shown in FIG. 2a, the faces 34 define a cavity therebetween of circular cross-section when anvils 24 are positioned in the illustrated condition.

For operation of the apparatus 20, the anvils 24 are initially positioned in a retracted condition as shown in FIG. 2 and the workpiece 35 (FIG. 1) is operatively positioned between the anvil faces 34. The illustrated workpiece 35 is cylindrical in shape and has a diameter which is slightly larger than the diameter of the circular spacing collectively defined by the anvil faces 34 when the anvils 24 are positioned in the FIG. 2a condition. Therefore, subsequent advancement of the anvils 24 by means of the hydraulic cylinders 28 move the faces 34 of the anvils in operative engagement with the surface of the workpiece just before the anvils 24 reach the circle-defining condition of FIG. 2a. Continued advancement of the anvils 24 exerts radially compressive forces on the workpiece 35 in a manner compressing the workpiece 35 so that its cross section corresponds in size to that of the circle defined by the anvil faces 34 when the anvils 24 are positioned in the FIG. 2a condition. Inasmuch as the six-anvil apparatus 20 compresses a workpiece along three radial paths intersecting at the workpiece center, apparatus 20 is believed to be better suited for compressing a cylindrical or rounded workpiece than would be a four-anvil apparatus of like construction which may only compress a workpiece along two radial paths.

It follows from the foregoing that the apparatus 20 exerts two-dimensional compression on the cylindrical workpiece 35 along two directions in a plane simultaneously while the entire cylindrical surface of the workpiece 35 is engaged by anvil faces 34 and wherein the line of action of the rams 30 passes through the center of the cylinder as illustrated by the arrows B of FIG. 2. It is believed that the apparatus 20 is thereby well-suited for bi-directional compression testing of cylindrically-walled vessels such as may be necessary for simulating hydrostatic pressure to which underwater vessels, such as submarines, are exposed.

With reference to FIG. 3, there is shown an assembly, generally indicated 40, containing a quantity, indicated 42, of sinterable particulate material prepared for consolidating in accordance with an embodiment of the method of the present invention. In addition to the particulate material quantity 42, the assembly 40 includes a hollow tube 44 and two end caps or plugs 46. The particulate mass quantity 42 is positioned within the hollow tube 44, and the end caps 46 are welded or otherwise fixedly secured at opposite ends of the tube 44 to thereby enclose the particulate mass quantity 42 within the tube 44 and between the caps 46. The assembly 40 is then in condition to be compressed with or without an increase in temperature in a manner described herein to consolidate the assembly 40 and the quantity 44 thereof into a single, unitary mass.

The hollow tube 44 is elongated so as to define two opposite end portions 48, 50 and is generally square in cross section. The inner and outer surfaces of the tube 44 are designated 56 and 58, respectively, in FIG. 3. Furthermore and as best shown in FIG. 3, the tube end portion 48 and 50 include ends 52 and 54, respectively, which are contained in parallel planes. Characteristically, the tube 44 is constructed of a mild, or malleable, material and possesses thin walls. For example, the material out of which the tube 24 is constructed is a mild steel but it will be understood that other suitable materials can be used in the tube composition. Moreover, the cross-sectional area of the tube 44 is small in comparison to the overall length of the tube 44. For example, and in the depicted assembly 40, the width of each of the four sides of the tube 44 is about 1.0 inch (2.5 cm) thereby rendering the tube cross-section about 1.0 square inches (6.5 sq. cm) whereas the overall length of the tube 44 is several inches long as, for example, 4.0 inches (10.2 cm).

With reference again to FIG. 3, the quantity 44 of particulate material may be any of a number of powdered or granular metal materials capable of being sintered by the appropriate application of heat and pressure thereto. For example, the quantity 42 of particulate mass depicted in the assembly 40 is a nickel aluminide IC 50 powder including 77.9 percent nickel, 21.7 percent aluminum, 0.1 percent boron and 0.3 percent zirconium wherein the foregoing percentages are percentages of the atomic weight of the mass and wherein each particle of powder is generally spherical in shape, but it will be understood that the material comprising the particulate mass quantity 44 can be another sinterable metal alloy or non-metal (e.g. ceramics or thermoplastics). Furthermore, the quantity 44 of particulate material is sufficient in amount to fill the hollow cavity of the tube 44, which cavity extends from about the plane of one tube end 52 to the plane of the other tube end 54.

With reference to FIG. 3, each end cap 46 of the assembly 40 is generally cup-like in form and defines a generally square periphery. Furthermore, the thickness of the material of each cap 46 is relatively small and each cap 46 is shaped so as to be snugly received by a corresponding end portion 48 or 50 of the tube 44. Like that of the tube 44, the material out of which each end cap 46 is constructed is a malleable material. For example, the material out of which each end cap 46 is constructed is a mild steel but it will be understood that another suitable material can be used in the end cap construction.

The aforedescribed components of the assembly 40 are assembled by positioning one end cap 46 within the end 54 of the tube 44 and placing the quantity 42 of particulate material through the other end 52 of the tube 44 so that the quantity 42 substantially fills the cavity of the tube 44. The remaining end cap 46 is then positioned within the end 52 of the tube 44 so as to enclose the quantity 42 within the tube 44. Each end cap 46 is fixedly secured within its corresponding tube end 52 or 54 by welding the edges of each cap 46 to the edges defined by a corresponding tube end 48 or 50.

The assembly 40 is then compressed with or without heating to complete the consolidating operation in accordance with an embodiment of the method of this invention. If heat is applied, the temperature of the assembly 40 is elevated to a predetermined temperature, which temperature is characteristically less than the melting point of the material comprising the particulate mass quantity 42. For example and in the depicted assembly 40 in which the quantity 42 is comprised of nickel aluminide having a melting point of about 1800° C., the temperature of the assembly 40 is raised to about 1000° C. Once elevated to the predetermined temperature, the assembly 40 is in condition to be compressed. It will be understood that the temperature to which the quantity 22 is raised is also less than the melting point of the material comprising the tube 44 and end cap 46.

During the step of compressing the assembly 40, pressure is applied to the outer surfaces of the tube 44 along paths arranged in a plane oriented generally perpendicular to the longitudinal axis of the tube 44. In accordance with the present invention, pressure is applied to the tube 44 along at least two or more directions in a plane oriented generally perpendicular to the longitudinal axis of the tube 44 to thereby render the compression of the assembly 40 two-dimensional. For the assembly 40 in which the tube 44 is of generally square cross-section, pressure is applied to the assembly 40 along directions oriented generally perpendicular to each of the tube sides.

Pressure during the step of compressing is applied to the assembly 40 and maintained for a preselected duration of time and repeated when appropriate. To sinter the particulate mass 42, pressure is applied against each of the opposite sides of the tube 44 to a pressure level equal to about 8,000 pounds per square inch and maintained at that level for about five seconds. Pressure is thereafter relieved and re-applied to the opposite tube sides at about the 8,000 pounds per square inch level for a five second duration three additional times. The sintering process is thereafter considered complete.

Because the quantity 42 of particulate mass is enclosed by the two-dimensionally compressed walls of the tube 44 and constrained by the end caps 46, shear stresses are generated within the quantity 42 of particulate material during the compression step. More specifically, shear stresses generated within the quantity 42 and believed to be at least partly responsible for a rapid change of shape of the particles of quantity 42 are generated by what is believed to be a three-dimensional stress field in which the principal stresses provided by the two-dimensional compression exceed the third principle stress arising from constraint from the end caps 46. Hence, by utilizing two-dimensional compression and an enclosed quantity of particulate material, the particles of the particulate mass deform in shape from their regular circular cross section to a polygonal cross-section so as to completely fill any voids within the quantity 42 when the quantity is viewed in a plane parallel to the plane of compression as best shown in FIG. 5.

It has been found that the quantity 42 of particulate material, once consolidated and/or sintered in accordance with the method of the present invention, has good strength characteristics and is believed to increase in strength with an increase in temperature. This latter-mentioned feature renders the sintered quantity 42 potentially useful in high-temperature applications, such as in turbine blades of jet aircraft engines.

Figure 6:
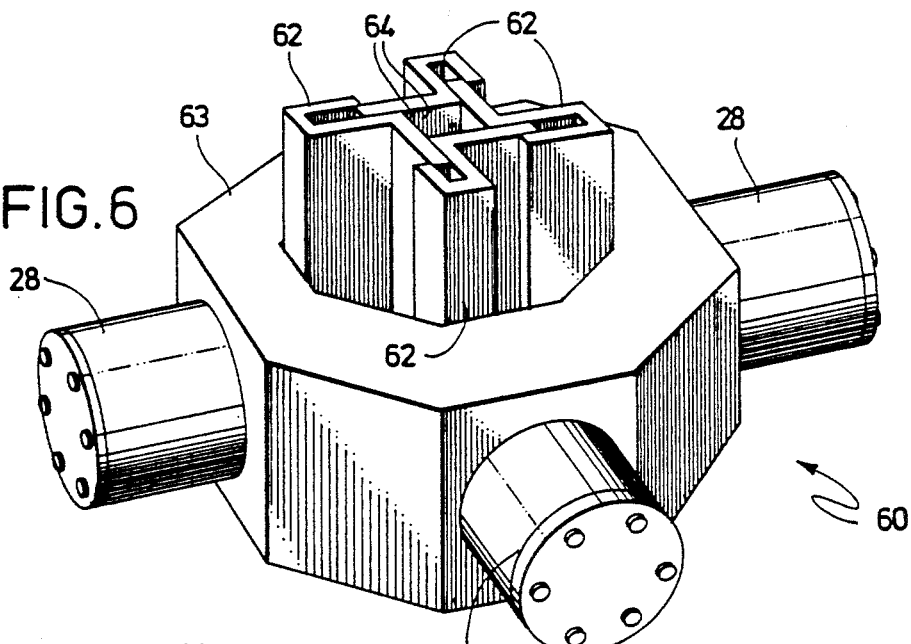
FIG. 6 is a perspective view of an apparatus with which the assembly of FIG. 3 can be compressed.
Figures 7, 8:
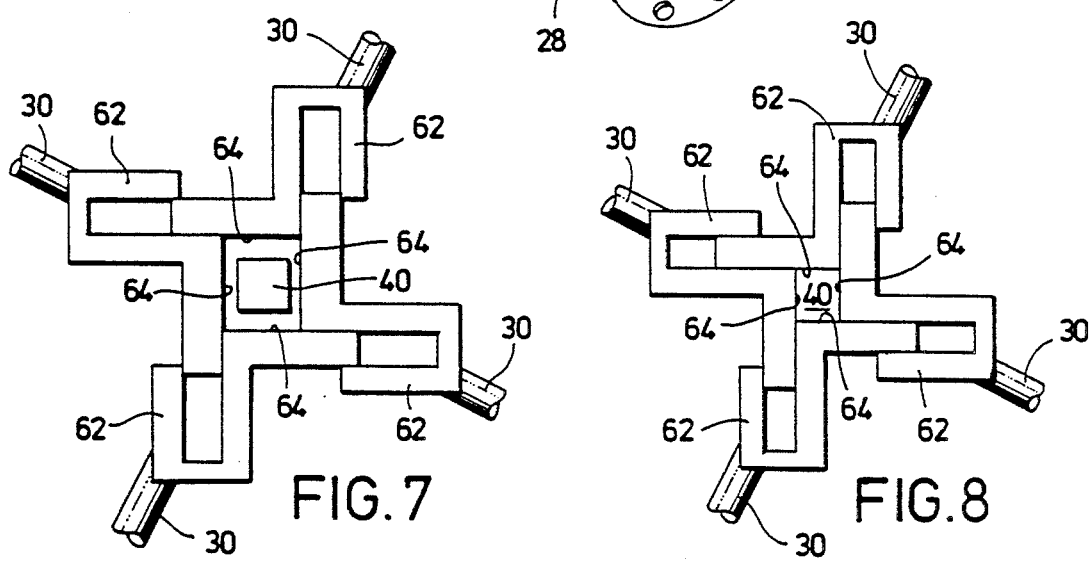
FIG. 7 is a fragmentary plan view of the FIG. 6 apparatus illustrating the conditions of the anvils thereof at the outset of a compression step.
FIG. 8 is a view similar to that of FIG. 7 illustrating the condition of the anvils at the completion of the compression step.

With reference to FIGS. 6–8, there is illustrated an apparatus 60 which can be used for compressing the assembly 40 in accordance with the aforedescribed method embodiment of the present invention. The apparatus 60 includes four G-shaped anvils 62 interfitted with one another and mounted within a frame 63 for movement generally toward and away from one another. More specifically, each anvil 62 includes an anvil or compression surface 64 arranged at a right angle in relation to an adjacent surface 64 and is movable relative to every other anvil surface 64 in the apparatus 60 from a condition illustrated in FIG. 7 to a condition illustrated in FIG. 8 as the movement of each anvil 62 is guided along a linear path by the shape of an adjacent anvil 62. For a reason apparent herein, the anvils 62 of the apparatus 60 are adapted to be moved to an intermeshed condition at which no spacing exists between the anvil faces 64.

Like apparatus 20 of FIGS. 1–3, the FIG. 6 apparatus 60 includes a base or frame 22 and hydraulic cylinder assemblies 28 operatively connected between the frame 22 and anvils 62 for moving the anvils 62 between the conditions of FIGS. 7 and 8 as the hydraulic pressure within the cylinders 28 is altered. Accordingly, components of the apparatus 60 which correspond to components of apparatus 20 of FIGS. 1-3 bear the same reference numerals. If desired, heating elements (not shown) can be embedded within the anvils 62 for heating a workpiece to a preselected temperature prior to a compression operation with the apparatus 60.

To utilize the apparatus 60 and with reference to FIG. 7, the assembly 40 is operatively positioned between the anvil surfaces 64 in the manner illustrated in FIG. 7 so that the longitudinal axis of the assembly 40 is substantially centered between the surfaces 64. The anvils 62 are then moved toward the FIG. 8 condition by means of the hydraulic cylinder assemblies 28 to compress the assembly 40 in the manner described above. It follows that since each of the four anvil surfaces 64 are arranged at a right angle with respect to an adjacent surface 64, the assembly 40 is compressed in two directions which are generally arranged in a perpendicular relationship to one another.

In accordance with another embodiment of the method of the present invention, liquids such as juice or oil is extracted from liquid-containing objects, such as fruit or seeds, with two-dimensional compression. In particular, two-dimensional compression is applied to the liquid-containing objects so that compression is exerted thereupon along two directions in a plane simultaneously and so that liquid contained within the object is squeezed therefrom.

It has been found that the apparatus 60 of FIGS. 6-8 is well-suited for extracting liquid in the aforedescribed manner. To perform such a method, the liquid-containing objects are placed between the anvil surfaces 64 and the anvils 62 are advanced by means of the hydraulic cylinder assemblies 28 to compress the liquid-containing objects and to thereby squeeze liquid therefrom. The extracted liquid can, in turn, be withdrawn from the space defined between the anvil surfaces 64 through an appropriate aperture or conduit within the apparatus 60, which aperture provides communication to the space defined between the anvil faces 64. It is believed that the capacity of the anvils 62 to be advanced to an intermeshed condition at which no spacing exists between the anvil faces 64 provides an advantage in liquid-extracting processes in accordance with the present invention because the liquid-containing objects can be squeezed into a mass having a relatively small (i.e., near zero) cross section and so that a relatively large percentage of liquid per unit volume of the object being squeezed is extracted thereby.

In accordance with still another embodiment of the method of the present invention, materials possessing the consistency of solid polybutadiene including mechanically rigid particles are internally fractured and thereby swelled by two-dimensional compression. More specifically, two-dimensional compression is applied to the materials possessing the aforedescribed consistency so that the material fractures adjacent to its mechanically rigid particles to create voids on unloading. With the voids created within the material, the material increases in volume. By way of example, a body of rubberized pencil eraser material possessing about the consistency of solid polybutadiene and containing mechanically rigid particles has been swollen by about forty percent from its original volume through the use of two-dimensional compression.

It has been found that apparatus of FIGS. 6-8 can be utilized to swell materials in accordance with the aforedescribed embodiment of the method of the invention. Such material is inserted within the space defined between the compression surfaces 64, when the anvils 62 are positioned in an opened condition, and the anvils 62 are subsequently advanced to exert two-dimensional compression upon the material. As the material is compressed, the material deforms along a direction oriented generally perpendicular to the plane of two-dimensional compression and when subsequently unloaded by retracting the anvils, swells in all three dimensions.

It is believed that the aforedescribed principles involved in fracturing and swelling materials with the use of two-directional compression can be utilized for accelerating the combustion reaction of solid rocket propellant of the type believed to possess the consistency of solid polybutadiene containing mechanically rigid particles. In this connection, solid rocket propellant possessing a consistency such as aforedescribed is believed to ignite more rapidly if propellant vapor permeates the propellant. By appropriately compressing the rocket propellant beyond its fracture limit, the propellant fractures internally to create, during unloading, voids adjacent the mechanically-rigid particles which voids are filled with propellant gas. Hence, by applying two-dimensional compression to the propellant so that the propellant fractures in a manner creating, during unloading, internal gas pockets throughout, the propellant is believed to ignite more rapidly and an accelerated combustion reaction with the propellant is believed to be achievable.

Figures 9, 10:
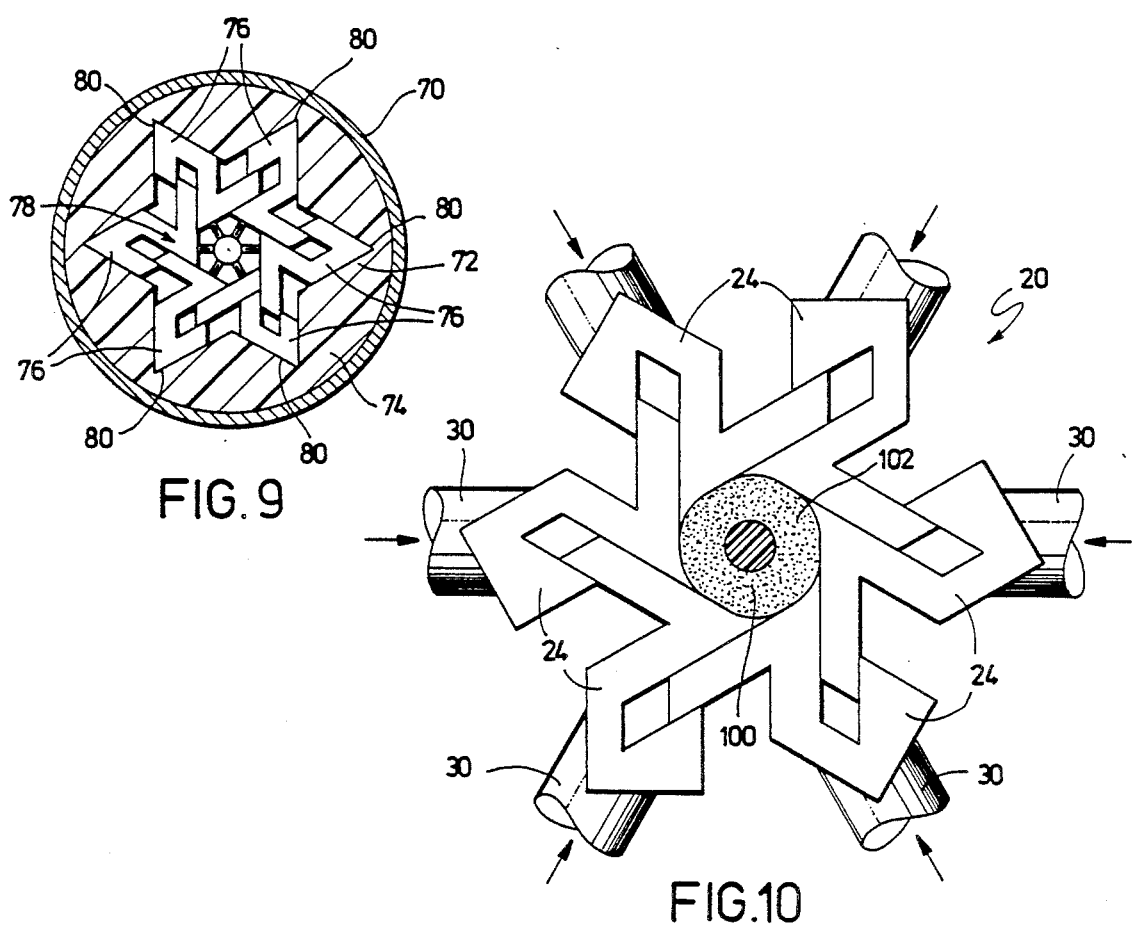
FIG. 9 is a somewhat schematic view of the cross-section of a fuel element casing of a rocket within which an embodiment of a method in accordance with the present invention can be carried out.
FIG. 10 is a plan view similar to that of FIG. 2 of the FIG. 2 apparatus shown utilized for forming a tube in accordance with an alternative method of the present invention.

With reference to FIG. 9, there is shown a schematic view of a cross section of the fuel element casing 70 of a rocket incorporating apparatus, generally indicated 72, for compressing and thereby fracturing the solid propellant contained with the casing 70. The casing 70 is hollow, and the apparatus 72 is supported substantially centrally of the casing 70 so as to extend longitudinally therealong. An amount of solid rocket propellant 74 is interposed between the fuel element casing 70 and the apparatus 72. The apparatus 72 includes a plurality of interfitting anvils 76 and associated hydraulic means, generally indicated 78, for moving the anvils 76 relative to one another. Each of the anvils 76 defines a generally radially outwardly-facing surface 80 conforming somewhat to the inside contour of the propellant 74, and the hydraulic means 78 is adapted to urge each anvil surface 80 radially outwardly from the center of the casing 70. At time of or immediately prior to rocket ignition, the anvils 76 are urged outwardly so that the rocket propellant 74 is compressed beyond its fracture limit against the rocket element casing and the anvils are subsequently retracted so to create the vapor-filled pockets on unloading as aforedescribed.

It will be understood that numerous modifications and substitutions can be had to the aforedescribed embodiments without departing from the spirit of the invention. For example, although the compression step of the aforedescribed method embodiments involving the sintering of particulate mass and extracting of a liquid from liquid-containing objects involves compression along two directions, it will be understood that a compression step in accordance with the broader aspects of these embodiments may be effected in more than two directions as long as the directions or paths along which pressure is applied are arranged in a plane.

Furthermore, although the quantity 42 of particulate mass (FIGS. 3–5) has been shown and described herein as including a quantity of sinterable metal powder, it will be understood that a quantity of particulate material suitable for compression in accordance with the broader aspects of the present invention may include ceramic whiskers, wood chips, a bundle of sinterable wires or may be comprised of powder which is desired to be tightly compacted.

Still further, and with reference to FIG. 10, a tube of compactable material can be formed with the apparatus 20 of FIG. 1 by positioning an elongate core 100 of material centrally of the cavity defined by the anvils 24 thereof, positioning an amount 102 of compactable material about the core 100, and applying compression to the amount 102 with the apparatus 20 so that the consolidated amount 102, with core 100, is subsequently removed from the apparatus 20, and the core 100 is removed from within the amount 100. The core 100 can be of an elastomer material or another suitable material providing a deformable surface against which the compactable material is compressed so that the surface of the core provides a degree of "give" or deformation under pressure. Alternatively, the surface of the core 100 can be rigid yet porous so that if the material being consolidated has fluid characteristics (e.g., resin), the material migrates into the pores of the core during compression. Removal of the core 100 after compression may be effected in a number of ways depending upon the type of material comprising the core. For example, the core 100 may be drilled out or, if possessing a lower melting temperature than the consolidated amount 102, melted and poured out. Accordingly, the aforedescribed embodiments are intended for the purpose of illustration and not as limitation.

What is claimed is:

1. A method for making a tube of compactable material comprising the steps of:
   providing an elongate core of material;
   positioning an amount of compactable material about the elongate core;
   applying two-dimensional compression to the compactable material to consolidate the compactable material abot the core wherein the pressure of compression is applied in at least two directions in a plane simultaneously and wherein the plane in which compression is applied is oriented generally perpendicular to the longitudinal axis of the core; and
   removing the core from the consolidated amount of compactable material.

2. A method as defined in claim 1 wherein the core against which the compactable material is compressed is deformable so that said step of applying compression deforms the core surface through the compactable material.

3. A method as defined in claim 1 wherein the core against which the compactable material is compressed is porous so that the compactable material migrates into the surface of the core during the step of compression.

4. A method as defined in claim 1 wherein said step of applying is preceded by the step of providing two-dimensional compression apparatus including a plurality of interfitting anvils supported for movement relative to one another along coplanar paths and having faces which, when the anvils are operatively moved relative to one another, exert compression on material positioned between the faces along at least two directions in a plane simultaneously, and said step of applying compression to the material is effected with the two-dimensional compression apparatus.

* * * * *